(12) United States Patent
Wirola et al.

(10) Patent No.: US 8,983,477 B2
(45) Date of Patent: Mar. 17, 2015

(54) GENERATION AND USE OF COVERAGE AREA MODELS

(75) Inventors: Lauri Wirola, Tampere (FI); Laura Maria Wirola, Tampere (FI); Tommi Antero Perala, Tampere (FI)

(73) Assignee: Nokia Corporation, Espoo (FI)

( * ) Notice: Subject to any disclaimer, the term of this patent is extended or adjusted under 35 U.S.C. 154(b) by 165 days.

(21) Appl. No.: 13/825,685

(22) PCT Filed: Sep. 23, 2010

(86) PCT No.: PCT/IB2010/054294
§ 371 (c)(1),
(2), (4) Date: Jun. 3, 2013

(87) PCT Pub. No.: WO2012/038779
PCT Pub. Date: Mar. 29, 2012

(65) Prior Publication Data
US 2013/0260771 A1     Oct. 3, 2013

(51) Int. Cl.
| | |
|---|---|
| H04W 4/00 | (2009.01) |
| H04W 24/00 | (2009.01) |
| H04W 40/00 | (2009.01) |
| H04B 17/00 | (2006.01) |
| H04L 12/28 | (2006.01) |
| H04W 16/18 | (2009.01) |
| G01S 5/02 | (2010.01) |

(52) U.S. Cl.
CPC ............ *H04W 16/18* (2013.01); *G01S 5/0252* (2013.01)
USPC ...................... 455/446; 455/67.11; 455/422.1; 455/423; 455/449; 455/456.1; 455/456.6; 370/254; 370/328; 370/338

(58) Field of Classification Search
CPC ....... H04W 24/00; H04W 40/00; H04W 4/00; H04W 16/18; H04W 64/00; H04L 12/28
USPC ............. 455/67.11, 456.1, 449, 456.2, 456.6, 455/446, 423, 422.1; 370/254, 328, 338
See application file for complete search history.

(56) References Cited

U.S. PATENT DOCUMENTS

2007/0258421 A1* 11/2007 Alizadeh-Shabdiz et al. ............................. 370/338

FOREIGN PATENT DOCUMENTS

| EP | 1 302 783 A1 | 4/2003 |
|---|---|---|
| WO | WO 2008/094993 A1 | 8/2008 |

OTHER PUBLICATIONS

International Search Report for Application No. PCT/IB2010/054294 dated Jun. 9, 2011.
Ali-Löytty, S., *Gaussian Mixture Filters in Hybrid Positioning*, Tampere University of Technology, Publication 813, Tampere 2009, 132 pages.

(Continued)

*Primary Examiner* — Inder Mehra
(74) *Attorney, Agent, or Firm* — Alston & Bird LLP (57) ABSTRACT

For enhancing the positioning of a mobile device, a server may generate parameters for each of a plurality of models of a coverage area of a transmission node on the assumption of a different spatial constraint for a location of a receiving device. The parameters of each of the models may be provided along with the associated indication of the spatial constraint for transmission. The position of a mobile device may be determined by evaluating the parameters of each of the models.

23 Claims, 8 Drawing Sheets

(56) References Cited

OTHER PUBLICATIONS

Koski, L. et al., *Indoor Positioning Using WLAN Coverage area Estimates*, 2010 International Conference on indoor Positioning and Indoor Navigation, Zurich, Switzerland, Sep. 15-17, 2010, pp. 1-7.

Koski, L., *Positioning with Bayesian Coverage Area Estimates and Location Fingerprints*, Master's Thesis, University of Tampere, Mar. 2010, 2010 $7^{th}$ Workshop on Positioning Navigation and Communication, Dresden, Germany Mar. 11-12, 2010, pp. 99-106.

* cited by examiner

GENERATION AND USE OF COVERAGE AREA MODELS

FIELD OF THE DISCLOSURE

The invention relates to the coverage areas of transmission nodes, and more specifically to generation and use of such coverage area models.

BACKGROUND

The position of a mobile device can be determined in several ways. One option is using a radio-map based positioning.

Radio-map based positioning techniques utilize information on the coverage area of a transmission node for determining the position of a mobile device. A transmission node can be any node that transmits signals on the radio interface and that can be identified by the transmitted signals. It could be for instance a communication node of a cellular network or of a wireless local access network. The coverage area of a transmission node is the area in which a mobile device may hear signals from the transmission node. Alternatively, the coverage area may be limited based on various criteria. For instance, the coverage area may represent an area, in which the communication node can be heard at signal strength above a predetermined threshold signal strength.

A position of a mobile device can be determined to correspond for instance to the coverage area of a transmission node of which the mobile device is currently receiving signals. Alternatively, it could be determined to correspond to the center of the coverage area, with a maximum error indicated to be the maximum distance from the center to the boundary of the area, etc.

In case signals from multiple transmission nodes are detected by a mobile device, their coverage areas may be used in combination to find the most likely location of the mobile device. The location can be determined, for instance, to lie in the intersection of the coverage areas, at a weighted average of the coverage areas, or similar. The coverage areas may be given different weights depending on, for instance, the size of the coverage area or the observed signal strength.

A radio-map comprises models of the coverage area of several transmission nodes. A model of the coverage area of a transmission node may be determined in various ways.

If the location of a transmission node is known, a coverage area model can be formed using radio propagation models. If available, some additional information can be used, such as antenna azimuth and beam width. Moreover, some information about the environment can be utilized such as urban/sub-urban/rural. Furthermore, the landscape and the frequency affect the propagation and can be considered when using a radio propagation model.

Alternatively, a coverage area model can be formed using fingerprints. Fingerprints are samples that are collected by mobile devices with some independent positioning capability, such as an assisted global navigation satellite system (AGNSS) based positioning capability. A fingerprint may contain the location of the fingerprint and a list of the identities of transmission nodes from which signals are heard at the indicated location. The identity of a transmission node may be for instance a wireless local area network (WLAN) access point (AP) media access control (MAC) address or the cell-identity (ID) of a cell of a cellular communication network. In addition, a fingerprint may contain some other information, such as observed signal strength values.

Collected fingerprints can be used in various ways to construct a coverage area model for a transmission node.

A coverage area model may simply represent the maximum area in which signals of a transmission node have been detected according to the fingerprints. In this case the position estimate could lie in the intersection of coverage areas.

Another option is to model the coverage areas statistically to obtain a probability distribution of the coverage areas. In this case the intention is not to model the actual coverage area of the communication node, but in fact the distribution of the users within the true communication node coverage area. It may be assumed to this end that the location of mobile devices in the coverage area of a transmission node is normally distributed, with a mean corresponding to the mean of the location of the collected fingerprints and with a variance corresponding to the variance of the collected fingerprints. In such a case, the position estimate could be the maximum likelihood estimate of the joint probability distribution of the coverage areas of all transmission nodes from which a mobile device that is to be positioned receives signals.

SUMMARY OF SOME EMBODIMENTS OF THE INVENTION

An embodiment of a method according a first aspect of the invention comprises receiving parameters for a plurality of models of a coverage area of a transmission node, the parameters of each model being indicated to be generated on the assumption of a different spatial constraint for a location of a receiving device. The method further comprises estimating a position of a mobile device by evaluating the parameters of each of the models.

An embodiment of a method according a second aspect of the invention comprises generating, by a server, parameters for each of a plurality of models of a coverage area of a transmission node on the assumption of a different spatial constraint for a location of a receiving device. The method further comprises providing, by the server, the parameters of each of the models along with the associated indication of the spatial constraint for transmission.

A first embodiment of an apparatus according the first aspect of the invention comprises one or more means for realizing the actions of the embodiment of the method presented for the first aspect of the invention.

A first embodiment of an apparatus according the second aspect of the invention comprises one or more means for realizing the actions of the embodiment of the method presented for the second aspect of the invention.

The means of any of these first embodiments of an apparatus can be implemented in hardware and/or software. They may comprise for instance a processor for executing computer program code for realizing the required functions, a memory storing the program code, or both. Alternatively, they could comprise for instance circuitry that is designed to realize the required functions, for instance implemented in a chipset or a chip, like an integrated circuit.

A second embodiment of an apparatus according the first aspect of the invention comprises at least one processor and at least one memory including computer program code, the at least one memory and the computer program code configured to cause an apparatus at least to perform the actions of the embodiment of the method presented for the first aspect of the invention.

A second embodiment of an apparatus according the second aspect of the invention comprises at least one processor and at least one memory including computer program code, the at least one memory and the computer program code configured to cause a server at least to perform the actions of the embodiment of the method presented for the second aspect of the invention.

Moreover, an embodiment of a computer readable storage medium according to the first aspect of the invention is described, in which computer program code is stored. The computer program code causes a device to realize the actions of the embodiment of the method presented for the first aspect when executed by a processor.

Moreover, an embodiment of a computer readable storage medium according to the second aspect of the invention is described, in which computer program code is stored. The computer program code causes a server to realize the actions of the embodiment of the method presented for the second aspect when executed by a processor.

For both aspects of the invention, the computer readable storage medium is a non-transient medium and could be for example a disk or a memory or the like. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

It is to be understood that also the computer program code by itself has to be considered an embodiment of either of the aspects of the invention.

An embodiment of a system comprises any of the presented embodiments of an apparatus according to the first aspect of the invention, and a server configured to provide parameters for a plurality of models of a coverage area of a transmission node, the parameters of each model being indicated to be generated on the assumption of a different spatial constraint for a location of a receiving device.

Any of the described embodiments of an apparatus may comprise only the indicated components or one or more additional components. Any of the described embodiments of the apparatuses according to the first aspect of the invention may be for instance a module or component for a device. Alternatively, any of the described embodiments of the apparatuses according to the first aspect of the invention may be for instance a device, like a mobile device. Any of the described embodiments of the apparatuses according to the second aspect of the invention may be for instance a module or component for a server. Alternatively, any of the described embodiments of the apparatuses according to the second aspect of the invention may be for instance a server.

In any of the described embodiments of a method, the method may also be an information providing method, and in any of the described first embodiments of an apparatus, the apparatus may also be an information providing apparatuses. In any of the described first embodiments of an apparatus, the means of the apparatus may be processing means.

In certain embodiments of the methods presented for the first aspect, the methods are methods of using coverage area models. In certain embodiments of the apparatuses presented for the first aspect, the apparatuses are apparatuses for using coverage area models.

In certain embodiments of the methods presented for the second aspect, the methods are methods for generating coverage area models. In certain embodiments of the apparatuses presented for the second aspect, the apparatuses are apparatuses for generating coverage area models.

It is to be understood that the presentation of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

Figure 1:
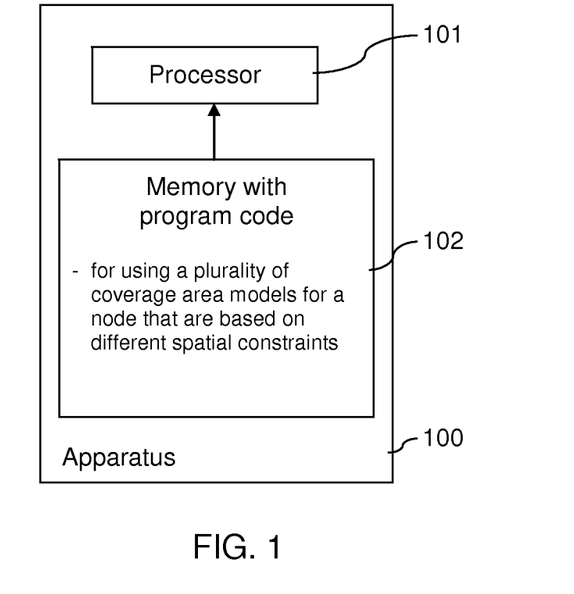
FIG. 1 is a schematic block diagram of an exemplary embodiment an apparatus according to the first aspect of the invention.

FIG. 1 is a schematic block diagram of an exemplary embodiment of an apparatus according to the first aspect of the invention.

Apparatus 100 comprises a processor 101 and, linked to processor 101, a memory 102. Memory 102 stores computer program code, which is designed for using a plurality of coverage area models for a transmission node, which models are based on different spatial constraints. Processor 101 is configured to execute computer program code stored in memory 102 in order to cause a device to perform desired actions.

An operation of apparatus 100 will now be described with reference to the flow chart of FIG. 2. The operation is an exemplary embodiment of a method according to the first aspect of the invention. Processor 101 and the program code stored in memory 102 cause a device to perform the operation when the program code is retrieved from memory 102 and executed by processor 101.

The device receives from a server a plurality of models of a coverage area of a transmission node. The parameters of each model are indicated to be generated on the assumption of a different spatial constraint for a location of a receiving device. (action 111)

The device then estimates a position of a mobile device by evaluating the parameters of each of the models. (action 112)

Figure 2:
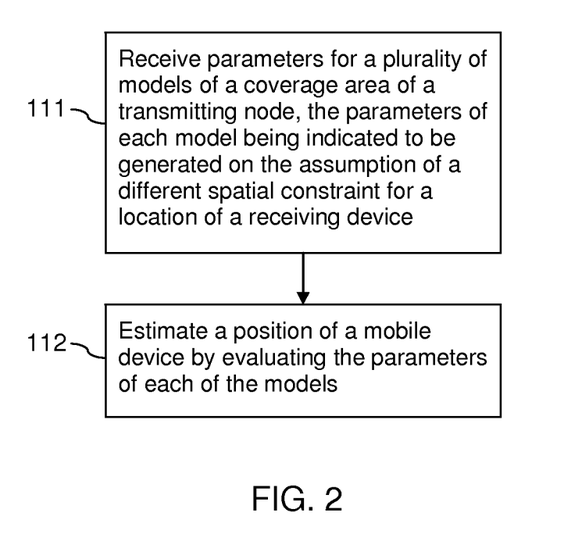
FIG. 2 is a flow chart illustrating an exemplary embodiment of a method according to the first aspect of the invention.

The operation presented in FIG. 2 thus enables a device to determine the position of a mobile device based on several differing coverage area models of a transmission node. The coverage area models take account of different spatial constraints and are provided by a server. The device can be in particular, but is not necessarily, the mobile device of which the position is to be determined.

Figure 3:
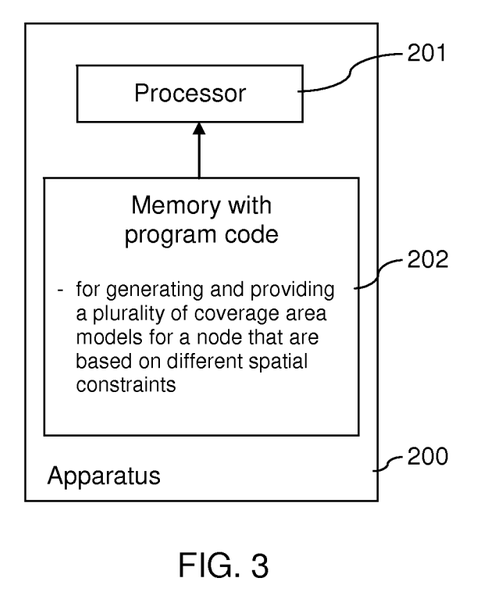
FIG. 3 is a schematic block diagram of an exemplary embodiment an apparatus according to the second aspect of the invention.

FIG. 3 is a schematic block diagram of an exemplary embodiment of an apparatus according to the second aspect of the invention.

Apparatus 200 comprises a processor 201 and, linked to processor 201, a memory 202. Memory 202 stores computer program code, which is designed for generating and providing a plurality of coverage area models for a transmission node that are based on different spatial constraints. Processor 201 is configured to execute computer program code stored in memory 202 in order to cause a server to perform desired actions.

An operation of apparatus 200 will now be described with reference to the flow chart of FIG. 4. The operation is an exemplary embodiment of a method according to the second aspect of the invention. Processor 201 and the program code stored in memory 202 cause a server to perform the operation when the program code is retrieved from memory 202 and executed by processor 201.

The server generates parameters for each of a plurality of models of a coverage area of a transmission node on the assumption of a different spatial constraint for a location of a receiving device. (action 211)

The server then provides the parameters of each of the models along with an indication of the associated spatial constraint for transmission. (action 212)

Figure 4:
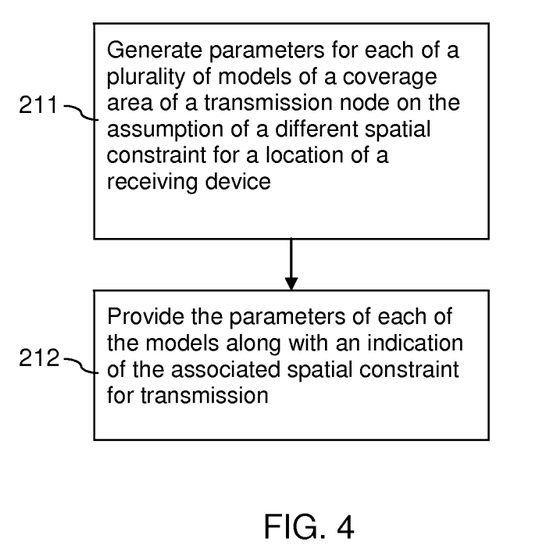
FIG. 4 is a flow chart illustrating an exemplary embodiment of a method according to the second aspect of the invention.

The operation presented in FIG. 4 allows considering spatial constraints that are to be used in a positioning of a mobile device already at a server.

Thus, an approach is described in which a coverage area model for a transmission node is split up into a plurality of coverage area models. Each model is provided for another spatial constraint. The generation of the parameters for the plurality of models is performed at a server and the generated parameters are then provided for transmission, for example to a mobile device. The mobile device, or another device receiving the parameters, considers the plurality of models for determining the position of a mobile device.

Certain embodiments of the invention may have the effect of limiting the complexity of the processing at a mobile device. Since spatial constraints are already taken into account in the parameters that are provided by a server, the mobile device does not have to consider spatial constraints, like map or floor plan constraints, when performing positioning. Certain embodiments of the invention may have the effect of enabling a simplified determination of a spatial constraint that is valid for the position of the mobile terminal. Certain embodiments of the invention may have the effect of enabling an improved positioning accuracy of a mobile device. Generating the parameters at a server may also have the effect of being able to perform the calculations only once for a plurality of mobile devices. Generating the parameters at a server may also have the effect of enabling an update of the parameters in a centralized manner.

Apparatus 100 illustrated in FIG. 1 and the operation illustrated in FIG. 2 as well as apparatus 200 illustrated in FIG. 3 and the operation illustrated in FIG. 4 may be implemented and refined in various ways.

In an exemplary embodiment, apparatus 100 could comprise one or more additional components, including for instance a user interface, a memory and/or a transceiver configured to enable an exchange of data via a radio interface. Apparatus 100 could be for instance a mobile terminal, like a mobile phone, a laptop or a netbook, or a module for a mobile terminal, like a chip, circuitry on a chip.

In an exemplary embodiment, apparatus 200 could comprise one or more additional components, including for instance a memory for storing the parameters and/or an interface configured to enable an exchange of data via a communication network. Apparatus 200 could be for instance a server or a module for a server, like a chip, circuitry on a chip, or a plug-in module.

The transmission node can be any node that transmits signals on a radio interface. It can be for instance an access point of a wireless local area network, like a WiFi™ certified network, or a communication node of a cellular communication network, like a base station of a global system for mobile communications (GSM) network, a Node B of a universal mobile telecommunications system (UMTS) network or an eNodeB of a long term evolution (LTE) network.

Using communication nodes of a cellular communication network may have the effect of obtaining a fairly comprehensive coverage, while using access points of a wireless local area network may have the effect of obtaining a better coverage within buildings.

Two exemplary spatial constraints that could be used for two different coverage area models for a particular transmission node are the constraint that a receiving device is located indoors and the constraint that a receiving device is located outdoors. It is to be understood that other and/or more refined spatial constraints could be used as well. Such spatial constraints could comprise the receiving device being located on a particular floor of a building, the receiving device being located in a particular corridor of a building, the receiving device being located in a particular room of a building, the receiving device being located in a particular street, the receiving device being located in an outdoor area associated to a particular address, etc.

The indication of a spatial constraint could be one of the parameters of a coverage area model. Alternatively, it could be for instance an additional tag.

The model of a coverage area reflecting a spatial constraint could be defined in various ways.

It could be a uniform distribution which simply defines the area to lie within certain boundaries. Using a uniform distribution has the effect of resulting in particularly simple models. It can be used for instance if the location of the node and possibly some other propagation relevant information is known and the general coverage area model is determined based on a radio propagation model in a conventional manner. The general coverage area model could also be generated using fingerprints originating, say, from the clients collecting data in the field. The general coverage area model could then be split up into several models based on a map or any other information on spatial constraints.

Alternatively, the model of a coverage area reflecting a spatial constraint could comprise a probability distribution, which assigns a certain probability to each location in the coverage area. Such a probability distribution could be for instance a truncated Gaussian distribution. That is, a Gaussian distribution of a general coverage area model without constraints could be truncated for each spatial constraint such that all values outside of the areas corresponding to the spatial constraint are reduced essentially to zero, or to some other low values, while all values inside the areas corresponding to the spatial constraint remain essentially unchanged, or are reduced only slightly. Alternatively, the probability distribution of each model of a coverage area reflecting a spatial constraint could be for example a weighted linear combination of Gaussian distributions, or Gaussian mixture. Gaussian distributions can be used for example if the coverage area is determined based on fingerprinting, since a Gaussian distribution is suited to map the entirety of the collected locations to the probability of a mobile device being located at a particular location.

A general coverage area model can be formed for instance using centre and variance of a large number of received fingerprints. Exemplary details on forming a coverage area estimate in general can be found for example in the Master's Thesis "Positioning with Bayesian coverage area estimates and location fingerprints" by Laura Koski, University of Tampere, March 2010.

Exemplary details on a Gaussian mixture filter using restrictive information can be found for example in the document "Gaussian Mixture Filters in Hybrid Positioning" by Simo Ali-Loÿtty, Tampere University of Technology, publication 813, Tampere 2009.

In addition, the signal strengths could be considered. To this end, it would be possible, for example, to create at first several signal strength related coverage area models for one transmission node. Each of the models may be defined by fingerprints that include a Received Signal Strength Indication (RSSI) greater than some threshold value. Thus, there might be a first coverage area model, which represents fingerprints including an RSSI greater than −30 dBm, a second coverage area model which represents fingerprints including an RSSI greater than −70 dBm, and so on. When the position of a mobile device is to be determined, the RRSI determined by this mobile device for a particular transmission node is checked, and if the RSSI exceeds −30 dBm, the −30 dBm model is selected, etc. Each of these signal strength related models can be further split using spatial constraints, like map data or a floor plan, as described above.

In an exemplary embodiment, the parameters for each of the plurality of models of a coverage area of a transmission node may be determined based on collected fingerprints that are provided along with an indication of the spatial constraints at the location of collection. Such an indication may be input for instance manually by the users of the devices providing the fingerprints. Alternatively, the parameters may be determined based on collected fingerprints in combination with at least one of a street map, a floor plan or other spatial information. Further alternatively, the parameters may be determined based on a radio propagation model in combination with at least one of a street map and a floor plan.

In an exemplary embodiment, the sever causes a storage of the generated parameters of the plurality of models for a particular transmission node along with an indication of the associated spatial constraint. New parameters could be generated and stored at regular intervals or whenever a predetermined amount of new information is available. Such an embodiment may have the effect that the parameters could be provided to a device without much delay, since they are always available and only have to be retrieved from a storage. Further, it could have the effect of saving processing time at the server, since the same parameters may be provided for transmission to a plurality of devices.

Alternatively, the parameters for a plurality of coverage area models could be generated for instance only upon a request to provide the parameters for a positioning of a mobile device. This could have the effect that the server does not have to store the parameters and that the provided parameters are always as up-to-date as possible.

In an exemplary embodiment, estimating a position of a mobile device comprises estimating which one of the spatial constraints is valid for the location of the mobile device. This may have the effect that information on the position of a mobile device is available that may be required by certain applications. It may further have the effect that additional limiting information is available for a positioning of the device and thus improve the accuracy of the positioning.

For an exemplary embodiment it may be assumed that the mobile device is located in the coverage area of a plurality of transmission nodes. The operation presented in FIG. 2 may then comprise receiving parameters for a plurality of models of a coverage area of each of the plurality of transmission nodes. The parameters of each model of the coverage area of a respective transmission node may be indicated to be generated on the assumption of a different spatial constraint for a location of a receiving device. The parameters of each model may comprise a weight and/or a probability. Estimating a position of the mobile device may then comprise determining the spatial constraint with the maximum combined weight and/or the maximum combined probability that is associated to the plurality of models for the particular spatial constraints.

Using coverage area models for a plurality of transmission nodes may have the effect of resulting in a more accurate position estimate. A position could be determined to lie in the intersection of the coverage area models of several transmission nodes. When considering changing transmission nodes that can be heard by a mobile device over time, this may also provide further information on whether the assumption of a particularly spatial constraint is strengthening.

Figure 5:
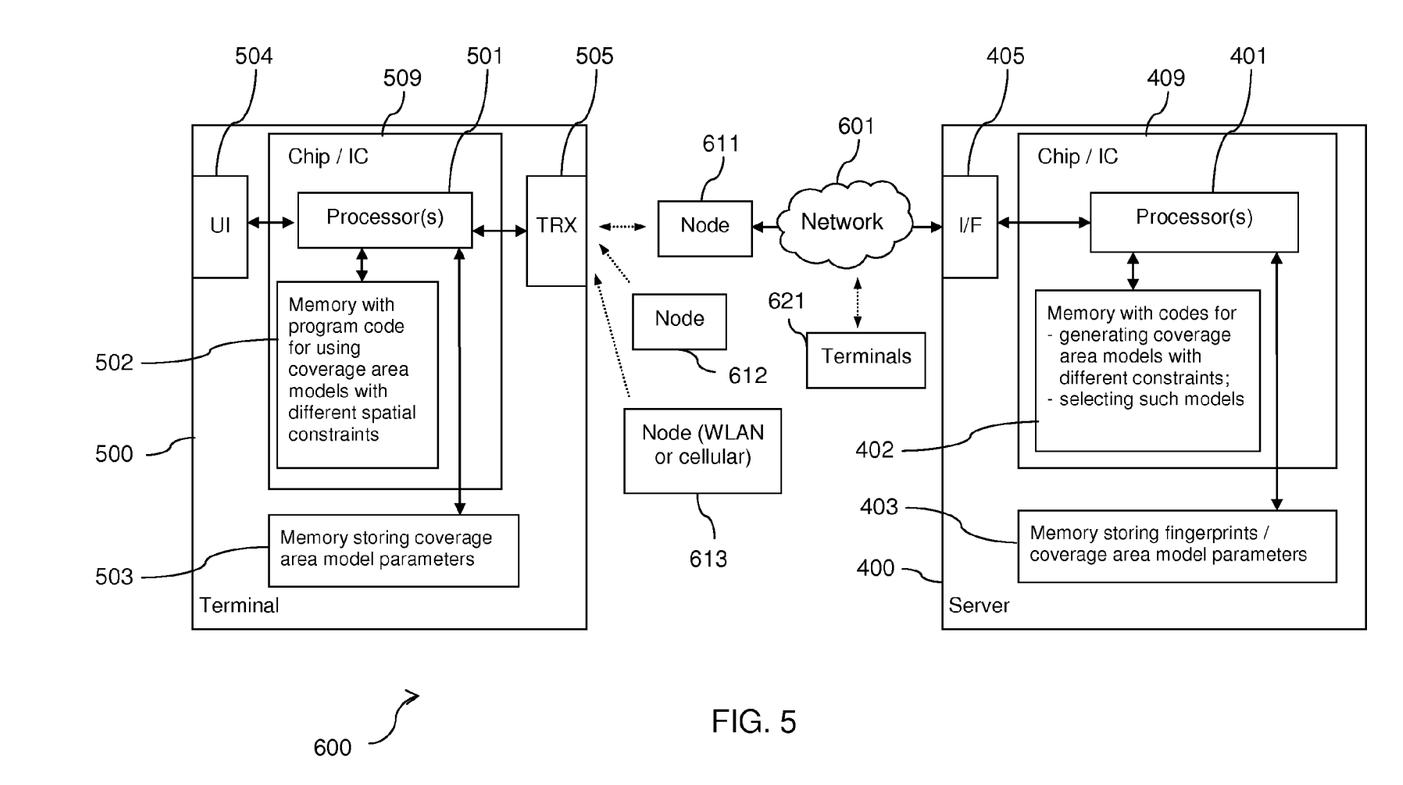
FIG. 5 is a schematic block diagram of an exemplary embodiment of a system according to the invention.

FIG. 5 is a schematic block diagram of an exemplary embodiment of a system.

System 600 comprises a server 400, a terminal 500, and a data transmission network 601 interconnecting server 400 and terminal 500. Server 400 could also belong to network 601. Network 601 could be for example the Internet. It could be accessed by terminal 500 for example via any of a plurality of communication nodes 611, 612, 613. The communication nodes 611, 612, 613 may comprise base stations of a radio access network (RAN) of a cellular communication network and/or access points of wireless local area networks. System 600 further comprises other terminals 621 that are able to communicate with server 400 via network 601 using arbitrary communication nodes.

Server 400 could be any kind of a server that supports a positioning of a mobile terminal. Server 400 may comprise a processor 401 that is linked to a first memory 402, a second memory 403 and an interface 405. Second memory 403 could also be external to server 400.

Processor 401 is configured to execute computer program code, including computer program code stored in memory 402, in order to cause server 400 to perform desired actions. Memory 402 stores computer program code for generating coverage area models and for selecting such models for a particular mobile device. The computer program code may comprise for example similar program code as memory 202. In addition, memory 402 may store computer program code implemented to realize other functions, as well as any kind of other data.

Processor 401 and memory 402 may optionally belong to a chip or an integrated circuit 409, which may comprise in addition various other components, for instance a further processor or memory.

Memory 403 stores a database that can be accessed by processor 401. The database may comprise a radio map with generated parameters of coverage area models. In addition, memory 403 may comprise for instance a fingerprint database that can be used for updating the radio map.

Interface 405 is a component which enables server 400 to communicate with other devices, like terminal 500 and terminals 621, via network 601. Interface 405 could comprise for instance a TCP/IP socket.

Component 409 or server 400 could correspond to an exemplary embodiment of an apparatus according to the second aspect of the invention.

Terminal 500 could be any kind of mobile device that is able to communicate with a server, for instance a mobile phone, a laptop or a netbook.

Terminal 500 comprises a processor 501. Processor 501 is linked to a first memory 502, to a second memory 503, to a user interface 504 and to at least one transceiver (TRX) 505.

Processor 501 is configured to execute computer program code, including computer program code stored in memory 502, in order to cause terminal 500 to perform desired actions. Memory 502 stores computer program code for using coverage area models with different spatial constraints. The computer program code may comprise for example similar program code as memory 102. The program code could belong for instance to a comprehensive positioning application stored in memory 502. In addition, memory 502 may store computer program code implemented to realize other functions, as well as any kind of other data.

Processor 501 and memory 502 may optionally belong to a chip or an integrated circuit 509, which may comprise in addition various other components, for instance a further processor or memory or a part of transceiver 505, etc.

Memory 503 stores a database which can be accessed by processor 501. The database may comprise for instance received parameters of coverage area models. The database can be considered to be a radio map database, for instance a subset of the database in server 400. In addition, the memory may store any other kind of data, like processing results. Memory 503 may be for example an integrated memory of terminal 500, like a local cache, or an exchangeable memory card.

User interface 504 comprises components enabling a user input and components for providing an output to a user. User interface 504 may comprise for instance a keyboard, a display, a touchscreen, a microphone, speakers, etc.

The at least one transceiver 505 enables terminal 500 to communicate with other devices, like server 400, via communication network 601. The at least one transceiver 505 could comprise for instance a transceiver enabling an access to a cellular communication network, like a GSM or UMTS network. Alternatively or in addition, the at least one transceiver 505 may comprise a WLAN transceiver enabling an access to wireless local area networks.

Component 509 or mobile phone 500 could correspond to an exemplary embodiment of an apparatus according to the first aspect of the invention.

An exemplary operation in system 600 of FIG. 5 will now be described with reference to the flow chart of FIG. 6. On the left hand side, operations at server 400 are shown, which are caused by processor 401 executing computer program code retrieved from memory 402. On the right hand side, operations at terminal 500 are shown, which are caused by processor 501 executing computer program code retrieved from memory 502.

Server 400 receives fingerprints from a multitude of terminals 621. Each fingerprint comprises at least an indication of the location of the terminal and an indication of the identities of communication nodes that can be heard by the terminal at the indicated location. In addition, it may comprise an indication of a spatial constraint. Such a spatial constraint may be the terminal being located outdoors, indoors, on a particular floor, in a particular corridor, in a particular street, etc. The fingerprints may be collected in memory 403 before further processing. (action 411)

Server 400 generates for each identified communication node parameters for a model of the coverage area for each spatial constraint. The parameters of each model could comprise parameters of a Gaussian distribution or of weighted linear combinations of Gaussian distributions. Alternatively, they could simply define an area without any probability information. In addition, a weight may be assigned to each model. (action 412)

Server 400 causes a storing of the generated parameters, the parameters including the identity of the communication node, an indication of the respective constraint and an indication of the assigned weight. (action 412)

Thereupon, the data is stored in memory 403. (action 414)

Action 411 may be performed continuously, while actions 412 and 413 may be performed for instance at regular intervals or whenever a certain number of new fingerprints has been received in action 411. Alternatively, the actions could be performed for selected communication nodes, whenever coverage area models for these communication nodes are requested. A user of terminal 500 may have activated a positioning of the terminal via user interface 504.

Terminal 500 determines thereupon the identity of all communication nodes 611, 612, 613 from which it is currently able to receive signals. (action 511)

Terminal 500 requests from server 400 parameters for coverage area models for each of the identified communication nodes. The request includes the identity of each of the nodes. (action 512)

Server 400 receives the request. (action 421)

Server 400 selects from memory 403 the parameters for the coverage area models that are stored for each of the communication node identities indicated in the request. (action 422)

Server 400 provides the parameters for transmission to terminal 500. (action 423)

The structure of the provided coverage area model parameters could be, defined in Abstract Syntax Notation One (ASN.1), for instance as follows:

```
CoverageAreaModel ::= SEQUENCE {
    id              Identification, --for instance, WLAN MAC
                    address
    outdoorModelList SEQUENCE (1 ... maxComponents) OF
                    IModelElement   OPTIONAL,
    indoorModelList SEQUENCE (1 ... maxComponents) OF
                    OModelElement   OPTIONAL,
    ...
}
IModelElement   ::= SEQUENCE {
    model           ModelElement,
    floor           INTEGER(-10 .. 100)   OPTIONAL,
    corridor        CorridorID   OPTIONAL,
    ...
}
OModelElement   ::= SEQUENCE {
    model           ModelElement,
    street          StreetID   OPTIONAL,
    ...
}
```

-continued

```
ModelElement    :: SEQUENCE {
  weight          INTEGER (1 ... 100), --weight of the component
                  in percents
  centerPoint     CenterPoint, --center of the
                  component, various representations possible
  covariance FourByFourSymmetricMatrix, --shape of the
                  component, 2x2 matrix
  ...
}
```

The example reflects the splitting of the coverage area model "CoverageAreaModel" into indoor and outdoor component lists "indoorModelList" and "outdoorModelList". The component itself consists of the weight, a center point of the model and the shape of the component. The center point could be indicated as absolute or relative coordinates or even as address, office address, etc. The shape could be defined in a conventional manner in the form of a covariance matrix. The sum of weights over the indoor and outdoor components preferably sums up to 100%.

The indoor component can also identify the floor to which the component belongs. Likewise, information can be included which indicates to which corridor the component belongs. Similarly, for outdoor components an additional tag could be added denoting a particular street. The information may be used in a similar manner as floor and corridor information.

Terminal 500 receives for each communication node the parameters for a plurality of coverage area models and stores the parameters in memory 503. (action 513)

Terminal 500 then evaluates the coverage area models for all spatial constraints for determining its position. (action 514)

Terminal 500 could determine for instance separately for each spatial constraint the combined weight of all coverage area models for all nodes. If the spatial constraints are "indoors" and "outdoors", terminal 500 could determine for instance a combined probability and/or weight for all received outdoors coverage area models and a combined weight for all received indoors coverage area models. If the combined probability and/or weight for indoors is higher, it is determined that terminal 500 is located indoors. Terminal 500 may then determined to be located in the intersection of the indoors coverage area models. The intersection can be limited in addition to the parts having a significant value, that is to the indoors parts. Alternatively, the location in the intersection having the maximum likelihood estimate of the joint probability distribution could be selected.

Another simplified example will be presented for a case in which different spatial constraints correspond to three different floors of a building. In this case, a coverage area map of different wireless local area network access points AP1, AP2, AP3 has been split up into respectively three coverage area models, each for another one of a different floor F1, F2 and F3. The weights that are assigned to each access point for each floor can be taken from the following table:

|         | F1     | F2    | F3     | Sum    |
|---------|--------|-------|--------|--------|
| AP1     | 0.2    | 0.7   | 0.1    | =1.00  |
| AP2     | 0.09   | 0.9   | 0.01   | =1.00  |
| AP3     | 0.8    | 0.1   | 0.1    | =1.00  |
| Product | 0.0144 | 0.063 | 0.0001 | 1.00   |

The total weight for each access point is 1 or 100%, i.e. the combined probability mass of the components sums to 1. It can be seen that the highest combined weight is associated to floor F2, which would thus have the greatest total probability mass in the presented scenario. Terminal 500 could therefore be determined to be located on floor F2. The exact position on floor F2 could be further refined, if desired, by determining the intersection of the coverage area models for the three access points AP1, AP2 and AP3 for floor F2, or by estimating the maximum likelihood of the joint probability distributions of the coverage area models of the three access points AP1, AP2 and AP3 for floor F2.

The determined spatial constraint and the determined position can be further verified, if actions 511 to 514 are repeated various times. A particular spatial constraint may then strengthen relatively to other spatial constraints, for instance if terminal 500 moves and signals are received from other communication nodes. It is to be understood that if signals are received from other communication nodes, terminal 500 might only request parameters for these additional communication nodes in action 512, if previously received parameters are still stored in memory 503. (action 515)

The splitting of a coverage model area for a particular communication node will now be illustrated in more detail for some examples with reference to FIGS. 7 to 12.

Figure 7:
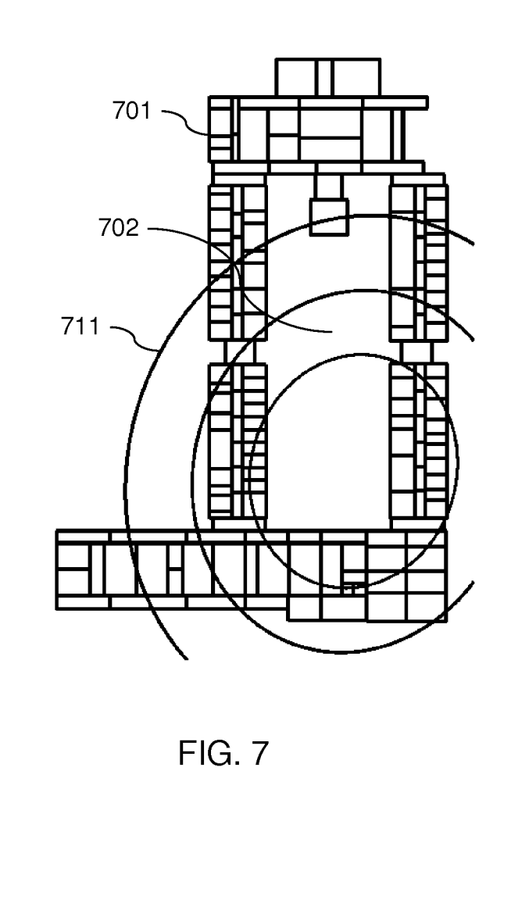
FIG. 7 is a diagram presenting an exemplary map and a coverage area of a communication node.

FIG. 7 is a diagram which presents a map showing corridors of a building 701. In the middle of the building, there is an open outdoor area 702. The diagram presents in addition ellipses 711 denoting equi-probability contours of a conventional coverage area model of a transmission node modeled as a Gaussian distribution. It can be seen that the coverage area covers locations within the building 701 as well as outside of the building, for instance open space 702.

Figure 8:
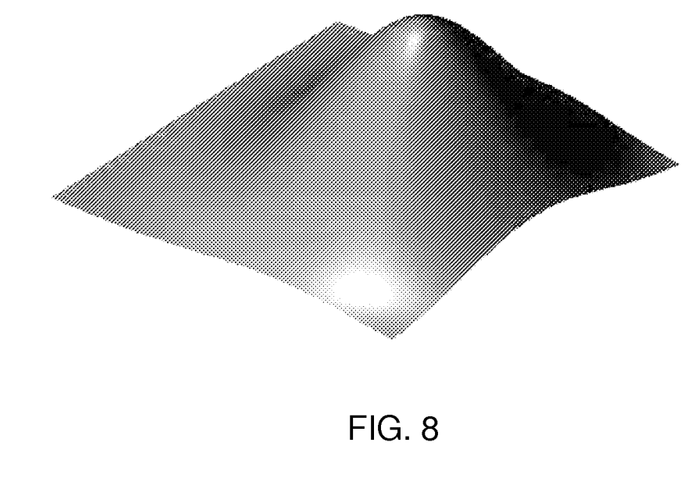
FIG. 8 is a diagram presenting an exemplary Gaussian distribution as a model of the coverage area of FIG. 7.

FIG. 8 is a diagram showing a three-dimensional illustration of the two-dimensional illustration of the Gaussian coverage area model of FIG. 7.

Figure 9:
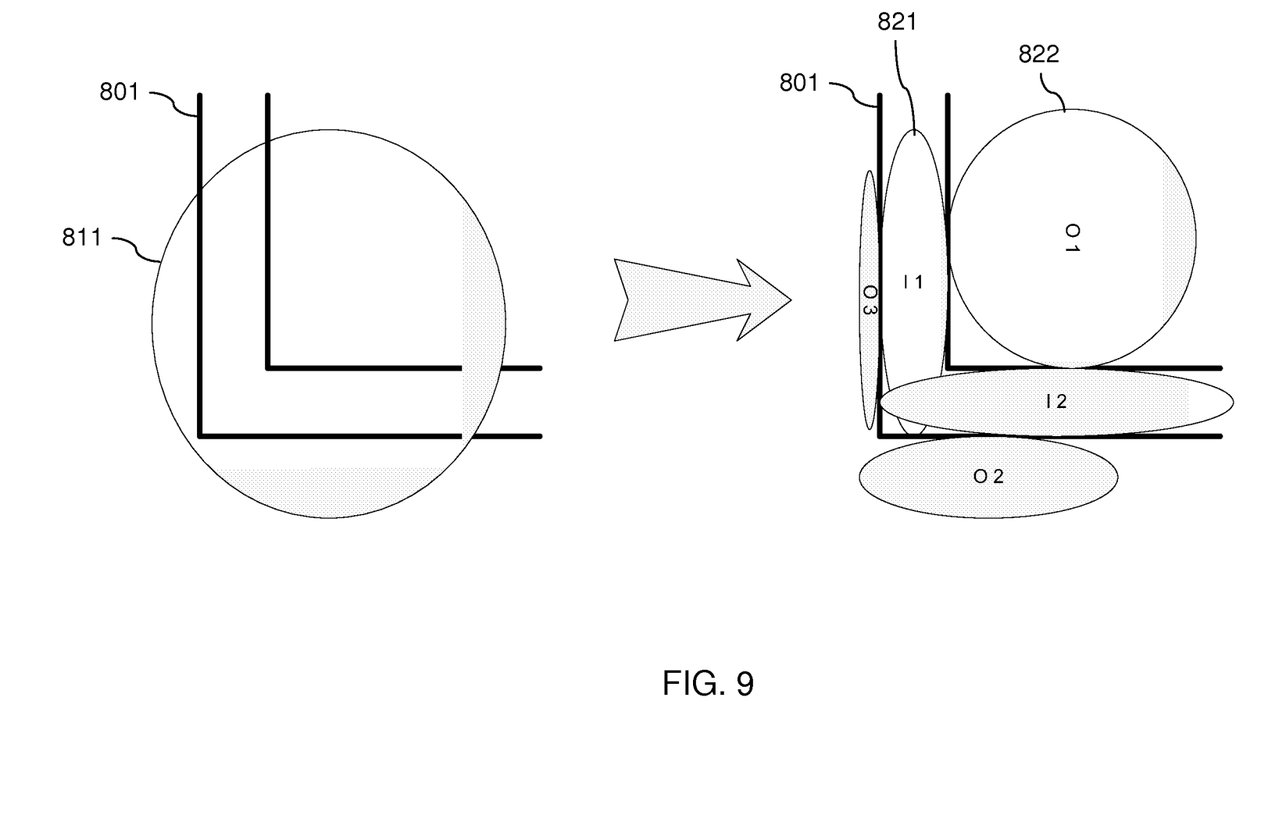
FIG. 9 illustrates an exemplary splitting of a coverage area model into indoor parts and outdoor parts.

FIG. 9 is a diagram which schematically illustrates a splitting up of a single coverage area model into a plurality of coverage area models.

The diagram of FIG. 9 presents on the left had side two corridors of a building 801 and a single coverage area model 811.

The diagram of FIG. 9 presents on the right hand side the same two corridors of a building 801. Here, however, the single coverage area model 811 has been split up into indoor parts 821 and outdoor parts 822. The indoor parts include two part I1 and I2 and the outdoor parts include three parts O1, O2 and O3.

Figure 10:
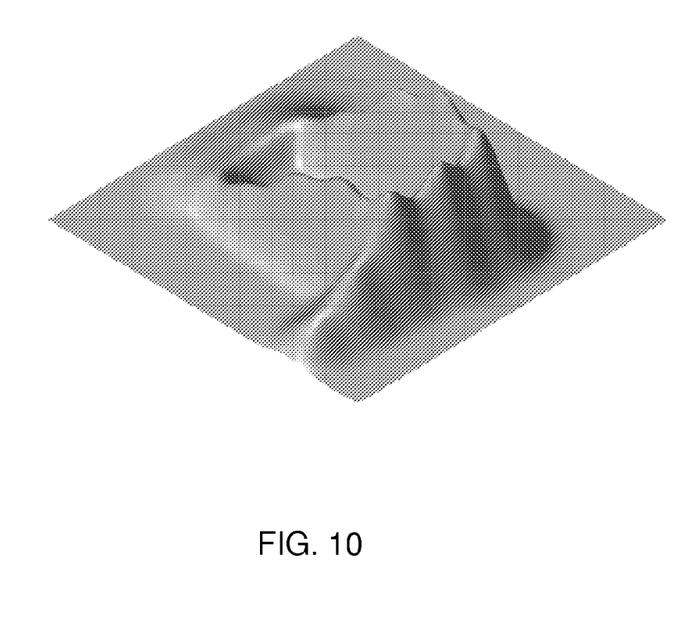
FIG. 10 is a diagram presenting an exemplary indoor coverage area model.
Figure 11:
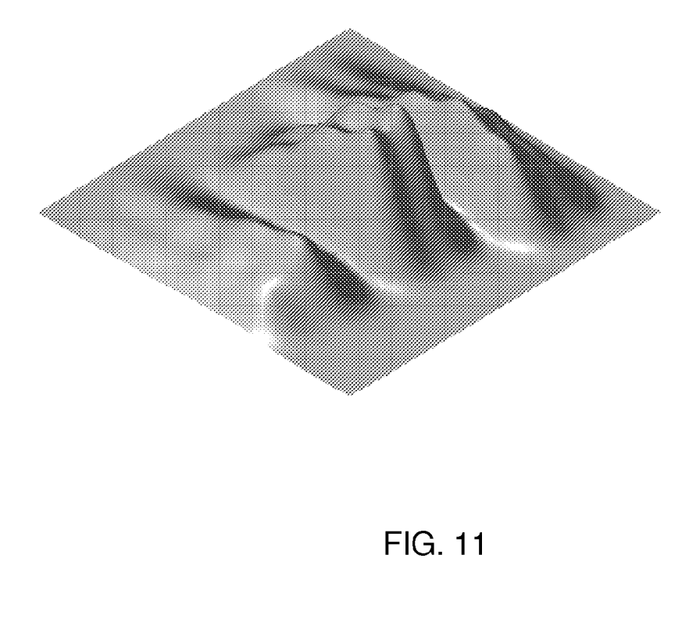
FIG. 11 is a diagram presenting an exemplary outdoor coverage area model.

FIGS. 10 and 11 illustrate an exemplary result when a single coverage area model as presented in FIG. 8 is split up based on map information as shown in FIG. 7 in a similar manner as presented in FIG. 9.

FIG. 10 is a diagram illustrating a coverage area model for indoors only. It can be seen that high probabilities are provided along the corridors of building 701 shown in FIG. 7, while a probability of zero or close to zero is provided outside of the building, including the open space 702 in the middle of building 701.

FIG. 11 is a diagram illustrating a coverage area model for outdoors only. It can be seen that high probabilities are provided outside of building 701. The open space 702 in the middle of building 701 is now reflected by a probability peak. A probability of zero or close to zero is provided along the corridors of the building 701 shown in FIG. 7.

Both coverage area models in FIGS. 10 and 11 are based on Gaussian mixtures, that is, weighted linear combinations of Gaussian distributions for several indoor parts and for several outdoor parts, respectively.

Thus, a single large coverage area having for instance an elliptic shape, as presented in FIG. 8, has been converted into two models having a more complex form. The divided coverage area models give evidence about the most probable location of a terminal.

Instead of a single indoors coverage area model as presented in FIG. 10, it would also be possible to use a plurality of indoors coverage area models, for example one for each corridor. Similarly, instead of a single outdoors coverage area model as presented in FIG. 11, it would also be possible to use a plurality of outdoors coverage area models, for example one for each street and one for the open space 702 in the middle of the building.

Now, when positioning a terminal, the terminal may consider on one hand the indoor model(s) and on the other hand the outdoor model(s). The terminal thus has two (or more) position hypotheses—one calculated based on the indoor model(s) and the other calculated based on the outdoor model(s). Now, in time—with movement of the terminal as well as with changing communication nodes for which indoor/outdoor models are available—either the indoor part or the outdoor hypothesis may strengthen relative to the other and the terminal is able to deduce that it is located indoors or outdoors.

It had already been indicated that in addition to differentiating between indoors and outdoors and optionally between different corridors and streets, it would also be possible to differentiate between different floors of a building.

Figure 12:
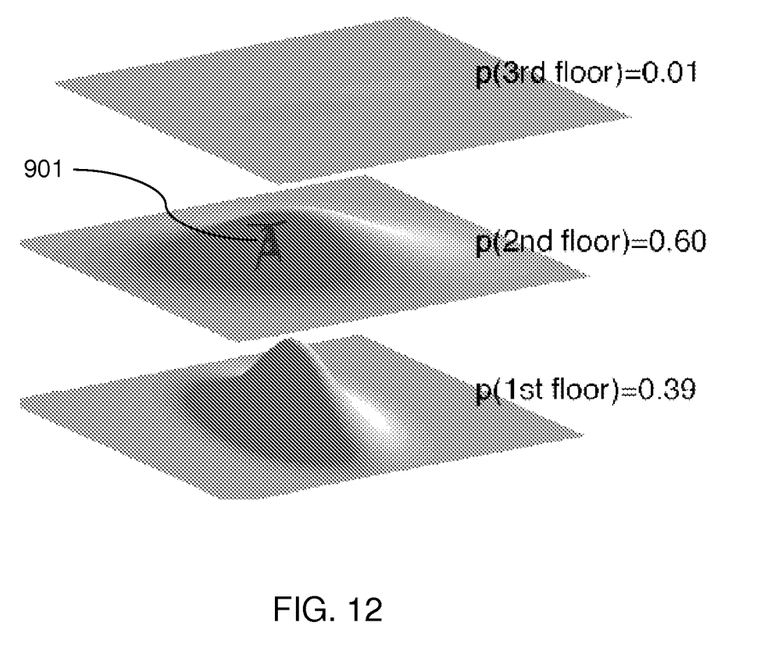
FIG. 12 illustrates exemplary separate coverage area models for three different floors.

An exemplary embodiment of different coverage area models for three different floors is illustrated in FIG. 12. A communication node 901 is arranged by way of example on the second floor.

FIG. 12 presents at the bottom a coverage area model for the first floor. The total probability p (1st floor) that a mobile device is located on the first floor, when it hears the communication node 901, is indicated to be 0.39. This value is also the weight that is associated to the coverage area model.

FIG. 12 presents in the middle a coverage area model for the second floor. The total probability p (2nd floor) that a mobile device is located on the second floor, when it hears the communication node 901, is indicated to be 0.60. This value is also the weight that is associated to the coverage area model.

FIG. 12 presents at the top a coverage area model for the third floor. The total probability p (3rd floor) that a mobile device is located on the third floor, when it hears the communication node 901, is indicated to be 0.01. This value is also the weight that is associated to the coverage area model.

The floor detection may be made in the similar manner as the outdoor/indoor detection. The terminal runs multiple hypothesis models, one for each floor. In time, one of the hypotheses for the floors starts to dominate over the others and the correct floor is detected.

Instead of indoor/outdoor tags, the floor number could be associated to these models in addition to an indoor tag.

Summarized, a transmission node is typically heard indoors, outdoors as well as across multiple floors, etc. Thus, it has a wide coverage area. When using an approach in which the coverage area of a transmission node is modeled as a single model, it is therefore challenging to deduce, whether the device is located outdoors or indoors, or on which floor the device is located.

Certain embodiments of the invention may enable an efficient detection whether the device is indoors or outdoors, or even a detection of the floor. A mobile device may have for instance multiple parallel location estimates, like one estimate for indoors and one estimate for outdoors, in a solver and allow the weight of one hypothesis to grow. Similarly, a floor detection could be achieved if a mobile device has multiple parallel floor hypotheses for a first, second and third floor, etc., in a solver and allows the weight of one hypothesis to grow.

Certain embodiments of the invention may enable an improved positioning accuracy for a terminal in general. Since a device is necessarily "indoors" or "outdoors", it is possible to test hypotheses for indoors and outdoors with respect to each other, when the coverage areas for "indoors" and "outdoors" are known.

Certain embodiments of the invention ensure that the processing complexity that is required for considering spatial constraints lies on the server side. That is, floor plans or street maps need not to be downloaded from a server to a mobile device, and the mobile device does not have to consider floor plan constraints, etc., since the server already considers such spatial constraints when forming the coverage area models. A server usually has higher computational capacities than a mobile device. In certain embodiments, it could even be provided that only certain components of the coverage areas are downloaded to a device.

Figure 6:
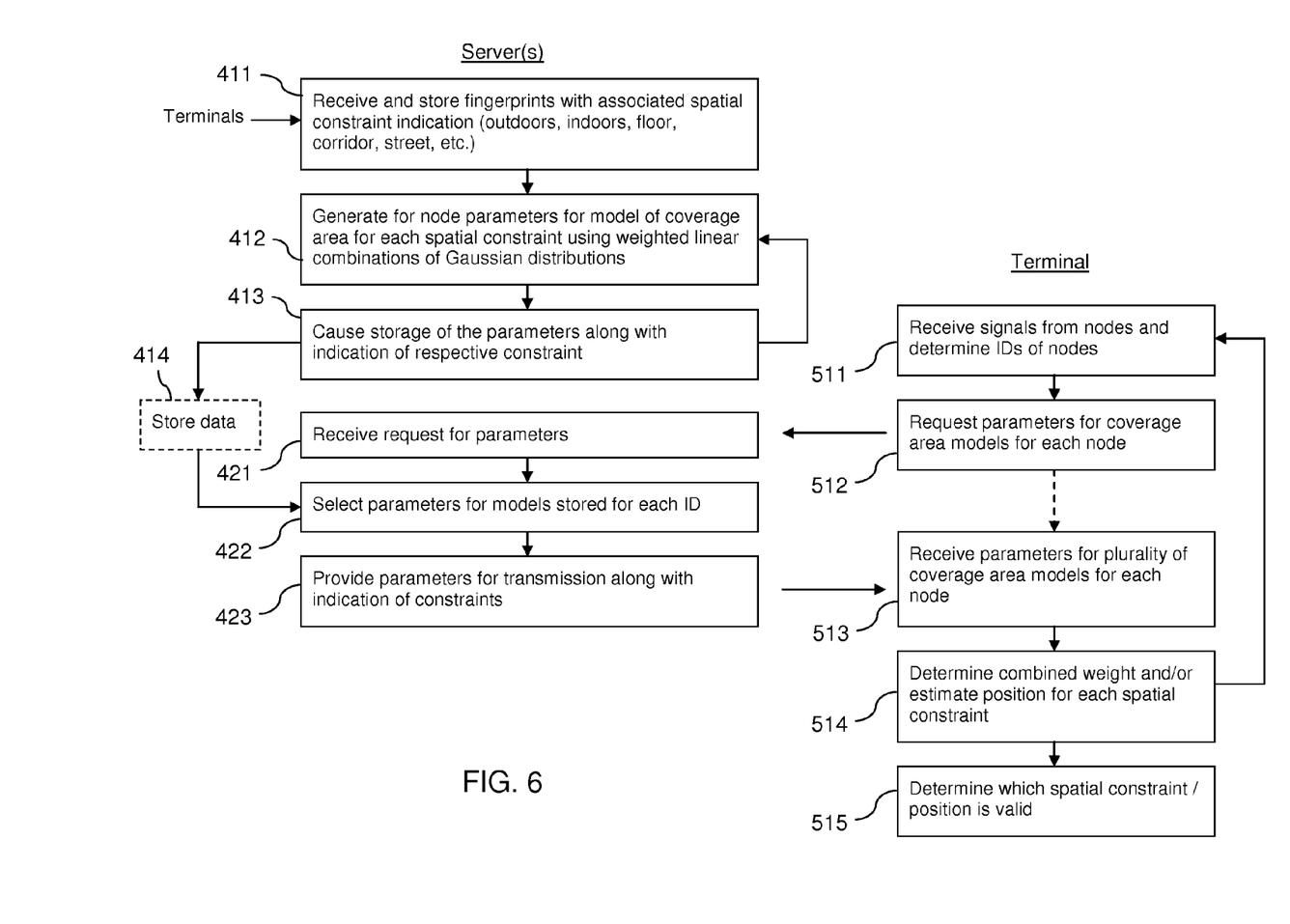
FIG. 6 is a flow chart illustrating an exemplary operation in the system of FIG. 5.

FIG. 2 and the right hand side of FIG. 6 may also be understood to represent exemplary functional blocks of a computer program code for using coverage area models.

FIG. 4 and the left hand side of FIG. 6 may also be understood to represent exemplary functional blocks of a computer program code for generating coverage area models.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory, a random access memory, a flash memory or a hard disc drive memory etc.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The functions illustrated by processor 101 in combination with memory 102 presented in FIG. 1 or component 509 presented in FIG. 5 can also be viewed as means for receiving parameters for a plurality of models of a coverage area of a transmission node, the parameters of each model being indicated to be generated on the assumption of a different spatial constraint for a location of a receiving device; and as means for estimating a position of a mobile device by evaluating the parameters of each of the models.

The program code in memory 102 or memory 502 can also be viewed as comprising such means in the form of functional modules.

The functions illustrated by processor 201 in combination with memory 202 presented in FIG. 3 or component 409 presented in FIG. 5 can also be viewed as means for generating, at a server, parameters for each of a plurality of models of a coverage area of a transmission node on the assumption of another spatial constraint for a location of a receiving device; and as means for providing, at the server, the parameters of each of the models along with the associated indication of the spatial constraint for transmission.

The program code in memory 202 or memory 402 can also be viewed as comprising such means in the form of functional modules.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an exemplary embodiment in a particular category may also be used in a corresponding manner in an exemplary embodiment of any other category.

What is claimed is:

1. A method comprising:
receiving parameters for a plurality of models of a coverage area of a transmission node, the parameters of each model describing a different spatial constraint for a location of a receiving device,
wherein the parameters of each of the models comprise a weight of the model, with the sum of the weights of the plurality of models being 100 percent.

2. The method according to claim 1, wherein estimating a position of a mobile device comprises estimating which one of the spatial constraints is valid for the location of the mobile device.

3. The method according to claim 1, wherein the method comprises receiving parameters for a plurality of models of a coverage area of each of the plurality of transmission nodes, the parameters of each model of the coverage area of a respective transmission node being indicated to be generated on the assumption of a different spatial constraint for a location of a receiving device, and wherein estimating a position of the mobile device comprises determining the spatial constraint with a maximum combined weight that is associated to the plurality of models for a particular spatial constraint.

4. The method according to claim 1, wherein the different spatial constraints comprise at least one of:
the receiving device being located indoors;
the receiving device being located outdoors;
the receiving device being located on a particular floor of a building;
the receiving device being located in a particular corridor of a building;
the receiving device being located in a particular room of a building;
the receiving device being located in a particular street; and
the receiving device being located in an outdoor area associated to a particular address.

5. The method according to claim 1, wherein each model comprises a probability distribution, and wherein the probability distribution is based on one of:
a truncated Gaussian distribution; and
a weighted linear combination of Gaussian distributions.

6. The method according to claim 1, wherein the transmission node is one of:
an access point of a wireless local area network; and
a communication node of a cellular communication network.

7. A method comprising:
generating, by a server, parameters for each of a plurality of models of a coverage area of a transmission node on the assumption of a different spatial constraint for a location of a receiving device, wherein the parameters of each of the models comprise a weight of the model, with the sum of the weights of the plurality of models being 100 percent; and
providing, by the server, the parameters of each of the models along with the associated indication of the spatial constraint for transmission.

8. A method according to claim 7, further comprising:
causing, by the server, a storage of the generated parameters of the plurality of models along with an indication of the associated spatial constraint.

9. The method according to claim 7, wherein the parameters for each of the plurality of models of a coverage area of a transmission node are determined based on one of:
collected fingerprints that are provided along with an indication of a spatial constraint at the location of collection;
collected fingerprints in combination with at least one of a street map and a floor plan; and
a radio propagation model in combination with at least one of a street map and a floor plan.

10. An apparatus comprising at least one processor and at least one memory including computer program code, the at least one memory and the computer program code configured to, with the at least one processor, cause a device at least to perform:
receive parameters for a plurality of models of a coverage area of a transmission node, the parameters of each model describing a different spatial constraint for a location of a receiving device,
wherein the parameters of each of the models comprise a weight of the model, with the sum of the weights of the plurality of models being 100 percent.

11. The apparatus according to claim 10, wherein estimating a position of a mobile device comprises estimating which one of the spatial constraints is valid for the location of the mobile device.

12. The apparatus according to claim 10, wherein the at least one memory and the computer program code configured to, with the at least one processor, further cause the device to receive parameters for a plurality of models of a coverage area of each of the plurality of transmission nodes, the parameters of each model of the coverage area of a respective transmission node describing a different spatial constraint for a location of a receiving device, and wherein estimating a position of the mobile device comprises determining the spatial constraint with a maximum combined weight that is associated to the plurality of models for a particular spatial constraint.

13. The apparatus according to claim 10, wherein the different spatial constraints comprise at least one of:
the receiving device being located indoors;
the receiving device being located outdoors;
the receiving device being located on a particular floor of a building;
the receiving device being located in a particular corridor of a building;
the receiving device being located in a particular room of a building;
the receiving device being located in a particular street; and
the receiving device being located in an outdoor area associated to a particular address.

14. The apparatus according to claim 10, wherein each model comprises a probability distribution, and wherein the probability distribution is based on one of:
a truncated Gaussian distribution; and
a weighted linear combination of Gaussian distributions.

15. The apparatus according to claim 10, wherein the transmission node is one of:
an access point of a wireless local area network; and
a communication node of a cellular communication network.

16. The apparatus according to claim 10, wherein the apparatus is one of:
a chip; and
a mobile terminal.

17. An apparatus comprising at least one processor and at least one memory including computer program code, the at least one memory and the computer program code configured to, with the at least one processor, cause a server at least to perform:
generate parameters for each of a plurality of models of a coverage area of a transmission node on the assumption of a different spatial constraint for a location of a receiving device, wherein the parameters of each of the models comprise a weight of the model, with the sum of the weights of the plurality of models being 100 percent; and
provide the parameters of each of the models along with the associated indication of the spatial constraint for transmission.

18. The apparatus according to claim 17, wherein the at least one memory and the computer program code configured to, with the at least one processor, further cause the server to:
cause a storage of the generated parameters of the plurality of models along with an indication of the associated spatial constraint.

19. The apparatus according to claim 17, wherein the at least one memory and the computer program code configured to, with the at least one processor, cause the server to determine the parameters for each of the plurality of models of a coverage area of a transmission node based on one of:
collected fingerprints that are provided along with an indication of the spatial constraints at the location of collection;
collected fingerprints in combination with at least one of a street map and a floor plan; and
a radio propagation model in combination with at least one of a street map and a floor plan.

20. The apparatus according to claim 17, wherein the apparatus is one of:
a chip;
a plug-in module; and
a server.

21. A computer readable storage medium in which computer program code is stored, the computer program code when executed by a processor causing a device to perform the following:
receiving parameters for a plurality of models of a coverage area of a transmission node, the parameters of each model being indicated to be generated on the assumption of a different spatial constraint for a location of a receiving device,
wherein the parameters of each of the models comprise a weight of the model, with the sum of the weights of the plurality of models being 100 percent.

22. A computer readable storage medium in which computer program code is stored, the computer program code when executed by a processor causing a server to perform the following:
generating parameters for each of a plurality of models of a coverage area of a transmission node on the assumption of another spatial constraint for a location of a receiving device, wherein the parameters of each of the models comprise a weight of the model, with the sum of the weights of the plurality of models being 100 percent; and
providing the parameters of each of the models along with the associated indication of the spatial constraint for transmission.

23. A system comprising:
an apparatus comprising at least one processor and at least one memory including computer program code, the at least one memory and the computer program code configured to, with the at least one processor cause a device at least to perform:
receive parameters for a plurality of models of a coverage area of a transmission node, the parameters of each model describing a different spatial constraint for a location of a receiving device,
wherein the parameters of each of the models comprise a weight of the model, with the sum of the weights of the plurality of models being 100 percent; and
a server configured to provide parameters for a plurality of models of a coverage area of a transmission node, the parameters of each model being indicated to be generated on the assumption of a different spatial constraint for a location of a receiving device.

* * * * *